A. L. PUTNAM.
QUICK MOUNTING DEVICE FOR VEHICLE WHEELS.
APPLICATION FILED MAY 16, 1921.

1,402,440.  Patented Jan. 3, 1922.

Inventor
Alden L. Putnam

By Whittemore Hulbert Whittemore
+ Belknap    Attorney

UNITED STATES PATENT OFFICE.

ALDEN L. PUTNAM, OF DETROIT, MICHIGAN, ASSIGNOR TO DETROIT PRESSED STEEL COMPANY, OF WILMINGTON, DELAWARE, A CORPORATION OF DELAWARE.

QUICK-MOUNTING DEVICE FOR VEHICLE WHEELS.

1,402,440.     Specification of Letters Patent.     Patented Jan. 3, 1922.

Application filed May 16, 1921. Serial No. 470,184.

*To all whom it may concern:*

Be it known that I, ALDEN L. PUTNAM, a citizen of the United States of America, residing at Detroit, in the county of Wayne and State of Michigan, have invented certain new and useful Improvements in Quick-Mounting Devices for Vehicle Wheels, of which the following is a specification, reference being had therein to the accompanying drawings.

The invention relates to demountable disk wheels and has for its primary object the obtaining of a construction which will permit of quick exchange of wheels, it being particularly applicable to racing cars. The invention therefore consists in the novel construction as hereinafter set forth.

Figure 1:
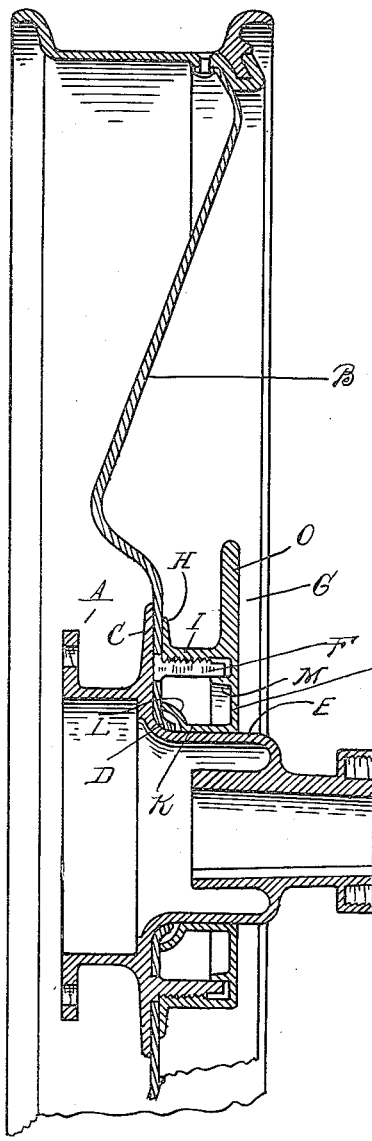
Figure 1 is a cross-section through the wheel in the axial plane of the hub.
Figure 2:
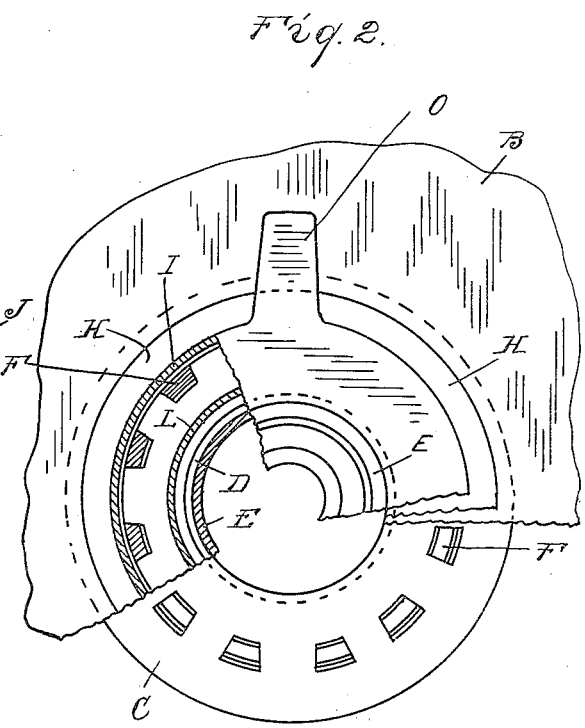
Figure 2 is an elevation of the hub showing a fragment of the disk and the clamping member therefor.

A is the wheel hub, and B the disk wheel mountable thereon, which bears against a radially extending annular flange C and is preferably provided with a turned flange D for seating on the cylindrical portion E of the hub.

It is usual to secure the disk to the flange C by a series of studs engaging registering apertures in the disk and an annular clamping member therefor. Each of the studs is provided with a nut which, when tightened, will press the annular clamping member against the disk and secure the same to the hub. Such a construction is not adapted to a quick exchange such as is necessarily made in a race, for the reason that each nut must be separately unscrewed and screwed onto its stud. On the other hand, when the studs are dispensed with and the clamping member is screwed directly on the hub, some provision must be made for transmitting the torque from the hub to the disk. There are also other conditions that render such a construction undesirable.

With my improved construction the hub is provided with an annular exteriorly threaded flange at a radial distance from the axis, substantially equal to that of the studs where used, and this threaded flange is slotted radially or cut away to form a series of spaced studs F. The disk B is formed with apertures corresponding in shape and registering with said studs so that it is capable of being quickly engaged or disengaged therefrom. G is a clamping member having a flange H parallel to the flange C and an interiorly threaded cylindrical portion I for engaging the peripherally threaded studs F. The member G is also provided with a radially inwardly extending flange J terminating in a cylindrical flange K for sleeving over the portion E of the hub. The inner end of this flange K is flared at L to fit over the flange D of the disk and the end of said flared portion bears against the outer face of the disk. M is an inwardly-extending annular flange on the portion J, which fits the inner faces of the studs F and serves to hold said studs from springing radially inward when clamping pressure is exerted.

With the construction as described the clamping member G may be quickly engaged or disengaged, either by means of a tool or by radially projecting operating handles O. When removed, the disk may be withdrawn from the studs, a new disk wheel engaged therewith, and the nut reengaged and tigthened by a few turns. When clamped, the disk will be securely fastened and the torque will be transmitted through the studs thereto.

What I claim as my invention is:

1. The combination with a disk wheel, of a hub on which said disk is mounted, a seat on said hub for said disk, a series of studs projecting from said seat and engageable with registering apertures in said disk, the entire series constituting an interrupted annular flange having a threaded face, and a clamping member provided with a cooperating threaded annular flange for engaging with said studs, and a bearing for pressing said disk against its seat.

2. The combination with a disk wheel, of a hub on which said disk is mounted, a seat for said disk on said hub, an annular series of spaced studs projecting from said seat and engageable with registering apertures in said disk, said studs constituting an interrupted annulus having a threaded face, a clamping member provided with a portion for pressing said disk against its seat, and an annular threaded portion for engaging said threaded studs, and a bearing on said clamping member sleeved upon said hub.

3. The combination with a disk wheel, of a hub on which said disk is mounted, a seat for the disk on said hub, an annular series of studs projecting laterally from said seat engageable with registering apertures in said disk and together constituting an interrupted annular flange provided with a threaded face, a clamping member having a portion for bearing against the disk to press the same against its seat, an annular flange portion threaded to engage said threaded studs, and a second annular flange for engaging the opposite sides of said studs to hold the same from springing under the thrust of the clamping pressure.

4. The combination with a disk wheel, of a hub on which said disk is mounted, a radial outwardly extending flange on said hub forming a seat for the disk, a cylindrical portion of said hub for engaging the eye or central aperture in the disk, a series of studs projecting from said seat engaging registering apertures in said disk, said studs together constituting an interrupted annular flange having a threaded peripheral face, a clamping member provided with a portion for engaging said disk to hold the same to said seat, an interiorly threaded annular portion for engaging said threaded studs, and a cylindrical portion for sleeving upon the cylindrical portion of said hub.

5. The combination with a disk wheel, of a hub on which said disk is mounted, a seat for said disk on said hub, a radially slotted interrupted annular flange projecting from said seat and having a threaded peripheral face, the segments of said flange engaging registering and correspondingly shaped apertures in said disk, and a clamping member having a portion for engaging said disk to hold the same to its seat, and an annular portion interiorly threaded to engage said threaded interrupted segments.

6. The method of forming a mounting for disk wheels consisting in forming the hub with a seat for the disk and an annular flange projecting laterally therefrom, peripherally threading said flange, radially slotting the flange to form thereof a series of interrupted segments or studs and forming in the disk correspondingly shaped registering apertures for engaging said segments.

In testimony whereof I affix my signature.

ALDEN L. PUTNAM.